United States Patent
Rub

(10) Patent No.: US 10,311,127 B2
(45) Date of Patent: *Jun. 4, 2019

(54) SPARSE MATRIX VECTOR MULTIPLICATION

(71) Applicant: Knowles Electronics, LLC, Itasca, IL (US)

(72) Inventor: Leonardo Rub, Mountain View, CA (US)

(73) Assignee: Knowles Electronics, LLC, Itasca, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/796,358

(22) Filed: Oct. 27, 2017

(65) Prior Publication Data

US 2018/0067899 A1    Mar. 8, 2018

Related U.S. Application Data

(63) Continuation of application No. 14/685,277, filed on Apr. 13, 2015, now Pat. No. 9,830,302.

(60) Provisional application No. 61/980,454, filed on Apr. 16, 2014.

(51) Int. Cl.
    *G06F 17/16*    (2006.01)

(52) U.S. Cl.
    CPC .................... *G06F 17/16* (2013.01)

(58) Field of Classification Search
    None
    See application file for complete search history.

(56) References Cited

U.S. PATENT DOCUMENTS

| 8,380,778 | B1 | 2/2013 | Bell | |
| 9,529,590 | B2 | 12/2016 | Song | |
| 9,830,302 | B1 * | 11/2017 | Rub | G06F 17/16 |
| 2007/0198621 | A1 | 8/2007 | Lumsdaine | |
| 2011/0307685 | A1 | 12/2011 | Song | |
| 2018/0067899 | A1 * | 3/2018 | Rub | G06F 17/16 |

* cited by examiner

*Primary Examiner* — David H Malzahn
(74) *Attorney, Agent, or Firm* — Foley & Lardner LLP

(57) ABSTRACT

Systems and methods for multiplying a sparse matrix by a vector using a single instruction multiple data (SIMD) architecture are provided. An example method includes sorting rows of the sparse matrix by a number of non-zero elements in the rows to generate sorted rows. The sorted rows are split to generate groups of the sorted rows. The number of rows in each group of the sorted rows is equal to the number of rows updated in parallel. The method allows for packing the sorted rows in each of the groups to generate packed rows. Each of the packed rows within the same group has the same length. Per clock cycle, C elements of the packed rows and data for selecting elements of the vector are provided to computational units in the SIMD architecture, where C is the number of computational units.

21 Claims, 8 Drawing Sheets

SIMD: Outer-product form    104

| Step | Operations | | | | |
|------|-----|-----|-----|-----|---|
| | MAC 1 | MAC 2 | MAC 3 | MAC 4 | |
| 1 | $r_1 = a_{11} b_1$ | $r_2 = a_{21} b_1$ | $r_3 = a_{31} b_1$ | $r_4 = a_{41} b_1$ | Each step: parallel multiplications and additions, done with 4 Multiply ACcumulate units (MACs) |
| 2 | $r_1 = r_1 + a_{12} b_2$ | $r_2 = r_2 + a_{22} b_2$ | $r_3 = r_3 + a_{32} b_2$ | $r_4 = r_4 + a_{42} b_2$ | |
| 3 | $r_1 = r_1 + a_{13} b_3$ | $r_2 = r_2 + a_{23} b_3$ | $r_3 = r_3 + a_{33} b_3$ | $r_4 = r_4 + a_{43} b_3$ | |
| 4 | $r_1 = r_1 + a_{14} b_4$ | $r_2 = r_2 + a_{24} b_4$ | $r_3 = r_3 + a_{34} b_4$ | $r_4 = r_4 + a_{44} b_4$ | |

SIMD: Outer-product form variant with "compound" MACs    106

| Step | Operations | | |
|------|-----|-----|---|
| | Compound MAC 1 | Compound MAC 2 | |
| 1 | $r_1 = a_{11} b_1 + a_{12} b_2$ | $r_2 = a_{21} b_1 + a_{22} b_2$ | Each step: parallel multiplications and additions, done with 2 compound MACs (each has 2 multipliers and 2 sequential adders) |
| 2 | $r_1 = r_1 + a_{13} b_3 + a_{14} b_4$ | $r_2 = r_2 + a_{23} b_3 + a_{24} b_4$ | |
| 3 | $r_3 = a_{31} b_1 + a_{32} b_2$ | $r_4 = a_{41} b_1 + a_{42} b_2$ | |
| 4 | $r_3 = r_3 + a_{33} b_3 + a_{34} b_4$ | $r_4 = r_4 + a_{43} b_3 + a_{44} b_4$ | |

Example matrix vector product $$\begin{bmatrix} r_1 \\ r_2 \\ r_3 \\ r_4 \end{bmatrix} = \begin{bmatrix} a_{11} & a_{12} & a_{13} & a_{14} \\ a_{21} & a_{22} & a_{23} & a_{24} \\ a_{31} & a_{32} & a_{33} & a_{34} \\ a_{41} & a_{42} & a_{43} & a_{44} \end{bmatrix} * \begin{bmatrix} b_1 \\ b_2 \\ b_3 \\ b_4 \end{bmatrix}$$

100

Traditional scalar implementation "Row times column"

102

| Step | Operation |
|---|---|
| 1 | $r_1 = a_{11} b_1 + a_{12} b_2 + a_{13} b_3 + a_{14} b_4$ |
| 2 | $r_2 = a_{21} b_1 + a_{22} b_2 + a_{23} b_3 + a_{24} b_4$ |
| 3 | $r_3 = a_{31} b_1 + a_{32} b_2 + a_{33} b_3 + a_{34} b_4$ |
| 4 | $r_4 = a_{41} b_1 + a_{42} b_2 + a_{43} b_3 + a_{44} b_4$ |

Each step: parallel multiplications, sequential additions (parallel additions expensive in hardware)

PRIOR ART

FIG. 1A

SIMD: Outer-product form

104

| Step | Operations | | | |
|---|---|---|---|---|
| | MAC 1 | MAC 2 | MAC 3 | MAC 4 |
| 1 | $r_1 = a_{11} b_1$ | $r_2 = a_{21} b_1$ | $r_3 = a_{31} b_1$ | $r_4 = a_{41} b_1$ |
| 2 | $r_1 = r_1 + a_{12} b_2$ | $r_2 = r_2 + a_{22} b_2$ | $r_3 = r_3 + a_{32} b_2$ | $r_4 = r_4 + a_{42} b_2$ |
| 3 | $r_1 = r_1 + a_{13} b_3$ | $r_2 = r_2 + a_{23} b_3$ | $r_3 = r_3 + a_{33} b_3$ | $r_4 = r_4 + a_{43} b_3$ |
| 4 | $r_1 = r_1 + a_{14} b_4$ | $r_2 = r_2 + a_{24} b_4$ | $r_3 = r_3 + a_{34} b_4$ | $r_4 = r_4 + a_{44} b_4$ |

} Each step: parallel multiplications <u>and</u> additions, done with 4 <u>M</u>ultiply <u>AC</u>cumulate units (MACs)

SIMD: Outer-product form variant with "compound" MACs

106

| Step | Operations | |
|---|---|---|
| | Compound MAC 1 | Compound MAC 2 |
| 1 | $r_1 = a_{11} b_1 + a_{12} b_2$ | $r_2 = a_{21} b_1 + a_{22} b_2$ |
| 2 | $r_1 = r_1 + a_{13} b_3 + a_{14} b_4$ | $r_2 = r_2 + a_{23} b_3 + a_{24} b_4$ |
| 3 | $r_3 = a_{31} b_1 + a_{32} b_2$ | $r_4 = a_{41} b_1 + a_{42} b_2$ |
| 4 | $r_3 = r_3 + a_{33} b_3 + a_{34} b_4$ | $r_4 = r_4 + a_{43} b_3 + a_{44} b_4$ |

} Each step: parallel multiplications <u>and</u> additions, done with 2 compound MACs (each has 2 multipliers and 2 sequential adders)

FIG. 1B

SIMD Sparse Matrix Vector Multiply Pseudo Code

400

```
for block = 1 : nBlocks
    load vector block
    load first group occupancy bits
    for group = 1 : nGroups
        initialize accumulators
        for i = 1: ceil(groupSize / 2)
            load matrix elements
            update R accumulators
        end
        store partial results
        load next group's occupancy bits
    end
end
```

} Hardware support may be added in some embodiments to perform these memory accesses in parallel to reduce overhead.

FIG. 4

SPARSE MATRIX VECTOR MULTIPLICATION

CROSS-REFERENCE TO RELATED PATENT APPLICATIONS

The present application is a continuation of U.S. patent application Ser. No. 14/685,277, filed Apr. 13, 2015, now U.S. Pat. No. 9,830,302, which application claims the benefit of U.S. Provisional Application No. 61/980,454, filed on Apr. 16, 2014. The subject matter of the aforementioned applications are incorporated herein by reference for all purposes.

FIELD

The present application relates generally to data processing and more specifically to systems and methods for sparse matrix vector multiplication with single instruction multiple data (SIMD) architectures.

BACKGROUND

It should not be assumed that any of the approaches described in this section qualify as prior art merely by virtue of their inclusion in this section.

A traditional approach for dealing with sparse matrices includes packing the data maximally and then attempting to minimize additional storage by specifying the location of the non-zero elements. The conventional approach may work well for computer systems having a central processor unit (CPU) using scalar arithmetic. However, the traditional approach does not work well with SIMD architectures unless the matrix has a known structure, such as, for example, a block diagonal.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The methods and systems for multiplying a sparse matrix by a vector using a SIMD architecture are provided. In various exemplary embodiments, the method for multiplying a sparse matrix by a vector using a SIMD architecture includes sorting rows of the sparse matrix by a number of non-zero elements in the rows to generate sorted rows. The exemplary method also includes splitting the sorted rows to generate groups of the sorted rows, wherein a number of rows in each group of the sorted rows is equal to a number (R) of rows updated in parallel. In addition, the exemplary method includes packing the sorted rows in each of the groups to generate packed rows, wherein each of the packed rows within the same group has a same length. The exemplary method also includes providing, per clock cycle, C elements of the packed rows to computational units in the SIMD architecture, wherein C is the number of computational units.

Other example embodiments of the disclosure and aspects will become apparent from the following description taken in conjunction with the following drawings.

BRIEF DESCRIPTION OF THE DRAWINGS

Embodiments are illustrated by way of example and not limitation in the figures of the accompanying drawings, in which like references indicate similar elements.

FIG. 1A is a block diagram showing a standard approach to a multiplication of a scalar matrix by a vector.

FIG. 1B is a block diagram showing two exemplary SIMD approaches to a full matrix vector multiplication.

FIG. 4 illustrates a pseudo code for an example software implementation of a sparse matrix vector multiplication based on the SIMD architecture.

DETAILED DESCRIPTION

Figure 2:
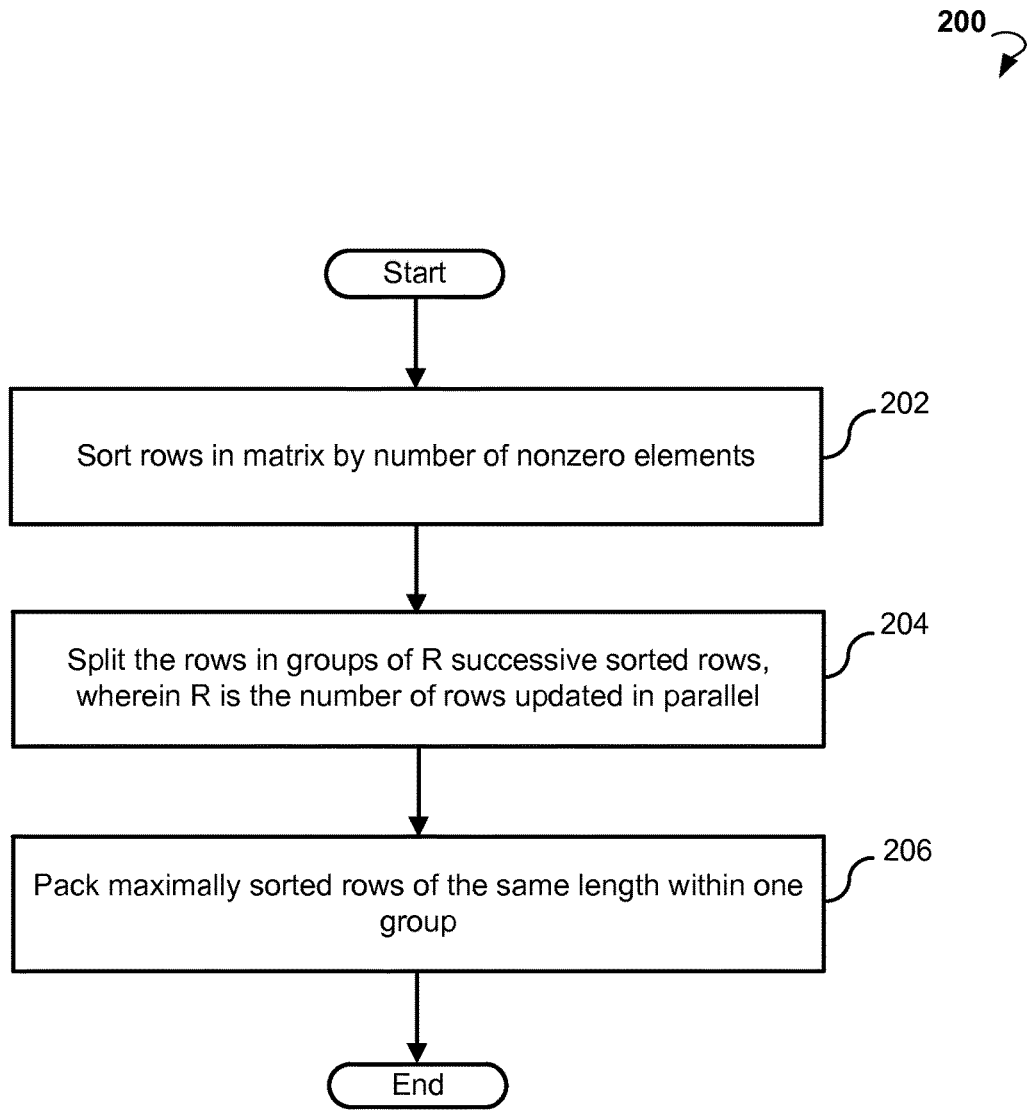
FIG. 2 is a flowchart showing a first section of a method for a sparse matrix vector multiplication, according to an example embodiment.

The following detailed description includes references to the accompanying drawings, which form a part of the detailed description. The drawings show illustrations in accordance with exemplary embodiments. These exemplary embodiments, which are also referred to herein as "examples," are described in enough detail to enable those skilled in the art to practice the present subject matter. The embodiments can be combined, other embodiments can be utilized, or structural, logical and electrical changes can be made without departing from the scope of what is claimed. The following detailed description is, therefore, not to be taken in a limiting sense, and the scope is defined by the appended claims and their equivalents.

A technology disclosed herein relates to systems and methods for multiplying sparse matrices by a vector using a SIMD architecture. For various embodiments, it may be advantageous for use with the SIMD architecture to separate the method into two sections: (1) matrix preparation, which is done once offline or at initialization, and (2) matrix vector multiplication, where the already prepared matrix is multiplied by a multitude of vectors.

Embodiments of the present disclosure may be practiced on computing devices such as, wearables, notebook computers, tablet computers, phablets, smart phones, personal digital assistants (PDAs), media players, wireless remote controls, mobile telephones, and the like.

The present technology can provide for efficient utilization of storage as well as million instructions per second (MIPS) reductions in sparse matrices of SIMD architectures.

According to an example embodiment, a method for multiplying sparse matrices by a vector using a SIMD architecture includes sorting rows of the sparse matrix by a number of non-zero elements in the rows to generate sorted rows. The exemplary method also includes splitting the sorted rows to generate groups of sorted rows. The number of rows in each group of the sorted rows is equal to the number (R) of rows updated in parallel, according to this example. The method may also include packing the sorted rows in each of the groups to generate packed rows. In this exemplary method, each of the packed rows within the same group has the same length. The exemplary method further includes providing, per clock cycle, C elements of the packed rows to computational units in the SIMD architecture, wherein C is the number of computational units.

FIG. 1A, identified as prior art, is a block diagram showing standard full matrix vector multiplication. An example 4×4 matrix vector product is shown in block 100. A standard "row times column" approach typically used in scalar computations for the 4×4 matrix vector product is shown in block 102. The standard approach shown in block 102 includes 4 steps (number of rows in the example matrix). Each step can include multiplications and additions. The multiplications can be carried out in parallel. As a rule, the additions are performed sequentially since operations of the parallel additions increase the cost of hardware resources.

FIG. 1B is a block diagram showing two exemplary SIMD approaches to a full matrix vector multiplication. A typical approach for the matrix vector multiplication with use of 4-way SIMD architecture is shown in block 104. For the 4×4 matrix vector multiplication shown in block 100, the architecture of block 104 includes 4 steps of parallel multiplications and parallel additions. The multiplications and additions can be performed using 4 MAC units.

An alternate approach for matrix vector multiplication using a SIMD architecture is shown in block 106. Instead of using 4 MACs as in block 104, the architecture shown in block 106 includes two compound MACs. A compound MAC is an equivalent of two MACs. For purposes of analysis, the number of computational units C is defined to be 4 for either the architecture shown in block 104 or in block 106. As will be seen later, the architecture shown in block 106 has some advantages in a case of a sparse matrix.

In various embodiments, each step shown in blocks 102, 104, and 106 can be a single-cycle instruction, a multi-cycle instruction, or a sequence of instructions. Some embodiments include instructions with single-cycle throughput; therefore, one step per clock cycle is performed.

In various example embodiments of the present disclosure, C denotes a number of computational units in an arithmetic logic unit (ALU), R denotes the number of rows updated in parallel, M denotes the total number of rows in the matrix, and N denotes the total number of columns in the matrix. In some embodiments, R is equal to C. In other embodiments, R divides C. In some embodiments, R also divides M. In order to keep the computational units busy, C/R updates of R dot products of the rows in the matrix with a (column) vector are performed in parallel, with one per computational unit. In various embodiments, the matrix includes different numbers of non-zero (NNZ) elements per row.

FIG. 2 is flow chart showing a first section (a matrix preparation) of a method 200 for sparse matrix vector multiplication, according to various embodiments. In block 202, the method 200 includes sorting the rows of the matrix by the number of the non-zero elements in the rows. In some embodiments, the rows are sorted in ascending order of the numbers of the non-zero elements. In other embodiments, the rows are sorted in descending order of the numbers of the non-zero elements.

In block 204, the method 200 includes splitting the rows in groups of successive sorted rows. In some embodiments, the number of rows in one group of the sorted rows is equal to the number (R) of rows updated in parallel.

In block 206, the method 200 allows for maximum packing of each row. While packing the sorted rows, the rows within the same group are shaped to have the same length using zero-padding.

Figure 3:
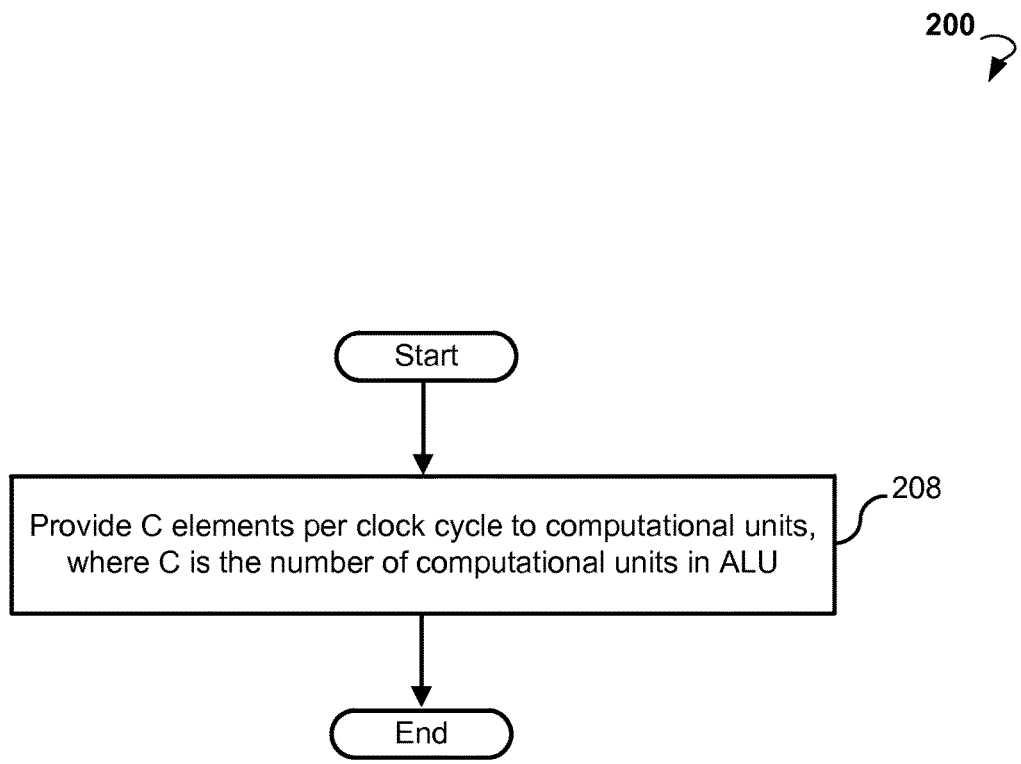
FIG. 3 is a flowchart illustrating a second section of a method for a sparse matrix vector multiplication, according to an example embodiment.

FIG. 3 is a flow chart showing a second section (a matrix vector multiplication section) of the method 200 for sparse matrix vector multiplication, according to various embodiments. In block 208, the method 200 includes providing C elements per clock cycle in the packed rows to the computational units in the ALU assigned to store elements of the matrix, where C is the number of the computational units in the ALU.

EXAMPLE 1

By way of example and not limitation, first assume that the matrix to be multiplied by a vector b has 8 rows (M=8) and 8 columns (N=8). The matrix elements are shown in Table 1. In the example matrix, the first digit of each nonzero element coincides with the row number while the second digit coincides with the column number (row and column numbers starting at one).

TABLE 1

|   |    |    |    |    |    |    |    | Number of Non-Zero Elements |
|---|----|----|----|----|----|----|----|------|
| 0 | 12 | 13 | 0  | 15 | 16 | 17 | 0  | 5 |
| 21| 0  | 0  | 24 | 0  | 0  | 0  | 28 | 3 |
| 0 | 32 | 0  | 0  | 0  | 36 | 0  | 0  | 2 |
| 41| 42 | 0  | 0  | 45 | 0  | 47 | 48 | 5 |
| 0 | 52 | 0  | 0  | 0  | 0  | 57 | 58 | 3 |
| 61| 62 | 0  | 0  | 0  | 0  | 0  | 0  | 2 |
| 0 | 0  | 0  | 74 | 0  | 76 | 0  | 0  | 2 |
| 81| 0  | 0  | 0  | 0  | 0  | 0  | 88 | 2 |

Then, assume that a number of computational units to process the matrix elements in the ALU is C=4 (such as the 4-way SIMD architectures shown in FIG. 1B). The method 200 applied to the example matrix in Table 1 results in the following memory layout (C=4, R=4) if architecture 104 (shown in FIG. 1B) is chosen:

TABLE 2

| | | | | | |
|---|---|---|---|---|---|
| Group 1 | 12 | 13 | 15 | 16 | 17 |
|  | 41 | 42 | 45 | 47 | 48 |
|  | 21 | 24 | 28 | 0 | 0 |
|  | 52 | 57 | 58 | 0 | 0 |
| Group 2 | 32 | 36 | | | |
|  | 61 | 62 | | | |
|  | 74 | 76 | | | |
|  | 81 | 88 | | | | wherein zero elements in rows 3 and 4 and columns 4 and 5 represent overhead. The overhead is required to make all rows within one group have the same length.

In some embodiments, generic memory access data is provided by Table 2, which is a memory layout or a representation of the matrix in Table 1 in the arithmetic units. In the above example, 64 elements are packed into 28 elements. The number of overhead elements added by zero padding is 4.

In general, in the worst case scenario, added overhead of zero padding is $(C-1) \times N$ for an M×N matrix. When M is much larger than C, the maximum relative impact $((C-1)/M)$ is very small.

The representation of Table 2 leads to the following computations (b1 to b8 are the elements of vector b) presented in Table 3:

TABLE 3

|  | Step | Operations | | | |
|---|---|---|---|---|---|
|  |  | MAC 1 | MAC 2 | MAC 3 | MAC 4 |
| Group 1 | 1 | $r_1 = 12\ b_2$ | $r_4 = 41\ b_1$ | $r_2 = 21 b_1$ | $r_3 = 52\ b_2$ |
|  | 2 | $r_1 = r_1 + 13\ b_3$ | $r_4 = r_4 + 42\ b_2$ | $r_2 = r_2 + 24\ b_4$ | $r_5 = r_5 + 57\ b_7$ |
|  | 3 | $r_1 = r_1 + 15\ b_5$ | $r_4 = r_4 + 45\ b_5$ | $r_2 = r_2 + 28\ b_8$ | $r_5 = r_5 + 58\ b_8$ |
|  | 4 | $r_1 = r_1 + 16\ b_6$ | $r_4 = r_4 + 47\ b_7$ | $r_2 = r_2 + 0$ | $r_5 = r_5 + 0$ |
|  | 5 | $r_1 = r_1 + 17\ b_7$ | $r_4 = r_4 + 48\ b_8$ | $r_2 = r_2 + 0$ | $r_5 = r_5 + 0$ |
| Group 2 | 6 | $r_3 = 32\ b_2$ | $r_6 = 61\ b_1$ | $r_7 = 74\ b_4$ | $r_8 = 81\ b_1$ |
|  | 7 | $r_3 = r_3 + 36\ b_6$ | $r_6 = r_6 + 62\ b_2$ | $r_7 = r_7 + 76\ b_6$ | $r_8 = r_8 + 88\ b_8$ |

In some embodiments, row number indices need to be stored in memory in order to specify where to store the result of each product. For example, assume each index can be stored in two bytes, so that the added overhead is 2*M. The indices (numbering starting at 1) corresponding to the layout in Table 2 are shown in Table 4:

TABLE 4

| 1 | 4 | 2 | 5 | 3 | 6 | 7 | 8 |
|---|---|---|---|---|---|---|---|

To perform the dot products, the vector or a portion of the vector needs to be available in a register and the appropriate elements selected for multiplication. In some embodiments, data needed for vector element selection is also stored in the memory. In various embodiments, several alternatives of standard sparse matrix representation can be used for this purpose. The tradeoffs are based on NNZ, the width of data elements, and the number of bits in a column index. With a not so sparse matrix (30%-50% populated), one byte per element, and a large number of columns, a bit vector representation is preferred. The relative overhead for one byte elements is approximately 12.5%. The combined bit vectors for all rows may be denoted as an occupancy matrix. An embodiment of the occupancy matrix for the layout in Table 2 is shown in Table 5 below. Scanning the "1" bits in the first row from left to right leads to the indication that vector elements $b_2$, $b_3$, $b_5$, $b_6$, and $b_7$ are the ones used to compute $r_1$ as shown in the Table 4.

TABLE 5

| 0 | 1 | 1 | 0 | 1 | 1 | 1 | 0 |
|---|---|---|---|---|---|---|---|
| 1 | 0 | 0 | 1 | 0 | 0 | 0 | 1 |
| 0 | 1 | 0 | 0 | 0 | 1 | 0 | 0 |
| 1 | 1 | 0 | 0 | 1 | 0 | 1 | 1 |
| 0 | 1 | 0 | 0 | 0 | 0 | 1 | 1 |
| 1 | 1 | 0 | 0 | 0 | 0 | 0 | 0 |
| 0 | 0 | 0 | 1 | 0 | 1 | 0 | 0 |
| 1 | 0 | 0 | 0 | 0 | 0 | 0 | 1 |

In some embodiments, additional logic can be added to the SIMD architecture to perform the vector element selection as described above. The additional logic can translate the bit vector representations to indices that are used for vector element selection.

Various Further Embodiments

In further embodiments, a block approach can be used to reduce resources required for performing sparse matrix vector multiplication. The matrix can be divided evenly into blocks of columns and the approach described above can be followed separately for each block. On average, this approach will have no impact on zero padding. Denoting B as the number of columns in a block, the overhead due to indexing (storing row number indices as described, for example in Table 4) will increase to 2*M*(N/B) (relative overhead of 2/B for one-byte matrix elements). In some embodiments, smaller block sizes can result in added execution cycle overhead.

In some embodiments, the ALU can be modified to reduce the overhead of zero padding. Instead of performing C MACS, the ALU can perform C multiplications, add the products pairwise, and then add the results to the previous accumulations as shown in block 106 (FIG. 1B). Assuming 8-bit fixed-point elements and 32-bit accumulators, this approach may allow reduction in hardware resources since the pairwise adders are only 16-bit wide. The benefit in storage is that now groups of C/2 rows can be used (R=C/2). This may reduce the maximum overhead of zero padding to $(((C/2)-1)/N)+(1/B)$. The reason for the added term is that the maximum NNZ in a group's row may be odd.

Using the approach for reducing the overhead of zero padding on the example 8×8 matrix shown in Table 1 may lead to the following layout (C=4, R=2) shown in Table 6:

TABLE 6

| Group 1 | 12 | 13 | 15 | 16 | 17 | 0 |
|---|---|---|---|---|---|---|
|  | 41 | 42 | 45 | 47 | 48 | 0 |
| Group 2 | 21 | 24 | 28 | 0 | | |
|  | 52 | 57 | 58 | 0 | | |
| Group 3 | 32 | 36 | | | | |
|  | 61 | 62 | | | | |
| Group 4 | 74 | 76 | | | | |
|  | 81 | 88 | | | | |

The representation shown in Table 6 leads to the following computations shown in Table 7:

TABLE 7

|  | Step | Operations | |
|---|---|---|---|
|  |  | Compound MAC 1 | Compound MAC 2 |
| Group 1 | 1 | $r_1 = 12\ b_2 + 13\ b_3$ | $r_2 = 41\ b_1 + 42\ b_2$ |
|  | 2 | $r_1 = r_1 + 15\ b_5 + 16\ b_6$ | $r_2 = r_2 + 45\ b_5 + 47\ b_7$ |

TABLE 7-continued

| | Step | Operations | |
|---|---|---|---|
| | | Compound MAC 1 | Compound MAC 2 |
| Group 2 | 3 | $r_1 = r_1 + 17 b_7 + 0$ | $r_2 = r_2 + 48 b_8 + 0$ |
| | 4 | $r_3 = 21 b_1 + 24 b_4$ | $r_4 = 52 b_2 + 57 b_7$ |
| | 5 | $r_3 = r_3 + 28 b_8 + 0$ | $r_4 = r_4 + 58 b_8 + 0$ |
| Group 3 | 6 | $r_5 = 32 b_2 + 36 b_6$ | $r_6 = 61 b_1 + 62 b_2$ |
| Group 4 | 7 | $r_7 = 74 b_4 + 76 b_6$ | $r_8 = 81 b_1 + 88 b_8$ |

With these practical considerations, the following performance can be expected with a 30% populated 512×512 matrix, number of updated rows R=8, number of computational units C=16 and column block size B=128:

TABLE 8

| Memory: Fixed overhead (%) [i, ii] | Memory: Zero fill overhead (%) [ii] | | Inner loop speedup factor [iii] | |
|---|---|---|---|---|
| | Avg. | Worst | Avg. | Worst |
| 14.1 | 1.1 | 2.1 | 52.8 | 52.2 |

[i] Doesn't include storing the maixmum NNZ in a group of rows, which amounts to negligible overhead.
[ii] Percent amounts are based on the size of the original matrix (512 × 512).
[iii] In general, execution cycle overhead will go up with C and go down wih block size (B). In some embodiments this overhead can be significant.

In some embodiments, hardware support is added to save occupancy matrix space when M is not an exact multiple of R and/or N is not an exact multiple of B.

FIG. 4 is pseudo code 400 for a possible software implementation of a sparse matrix vector multiplication based on a SIMD architecture. In some embodiments, hardware support may be added to allow loading of occupancy matrix sections from memory while partial results are stored to memory. In some embodiments, the hardware support may lead to substantial reduction in execution overhead.

In regard to terms in FIG. 4, in the 8×8 example layout shown in Table 6, nBlocks=1, R=2, nGroups=4, groupSize= [5, 3, 2, 2].

The following is a set of hardware requirements for an effective implementation:

a. Register storage for currently used vector elements (b1 to b8 in example 1).

b. Register storage for currently used matrix elements ($a_{11}$, $a_{12}$, $a_{13}$, and so forth).

c. Register storage for the portion of the occupancy bit matrix currently used.

d. Vector element selection logic, including translation of occupancy bits to indices.

e. Computational units: MAC or compound MAC.

f. Register storage for accumulations (equal to the number of rows per group).

g. Efficient loading of operands and occupancy bits.

h. Efficient storing of results.

Figure 5:
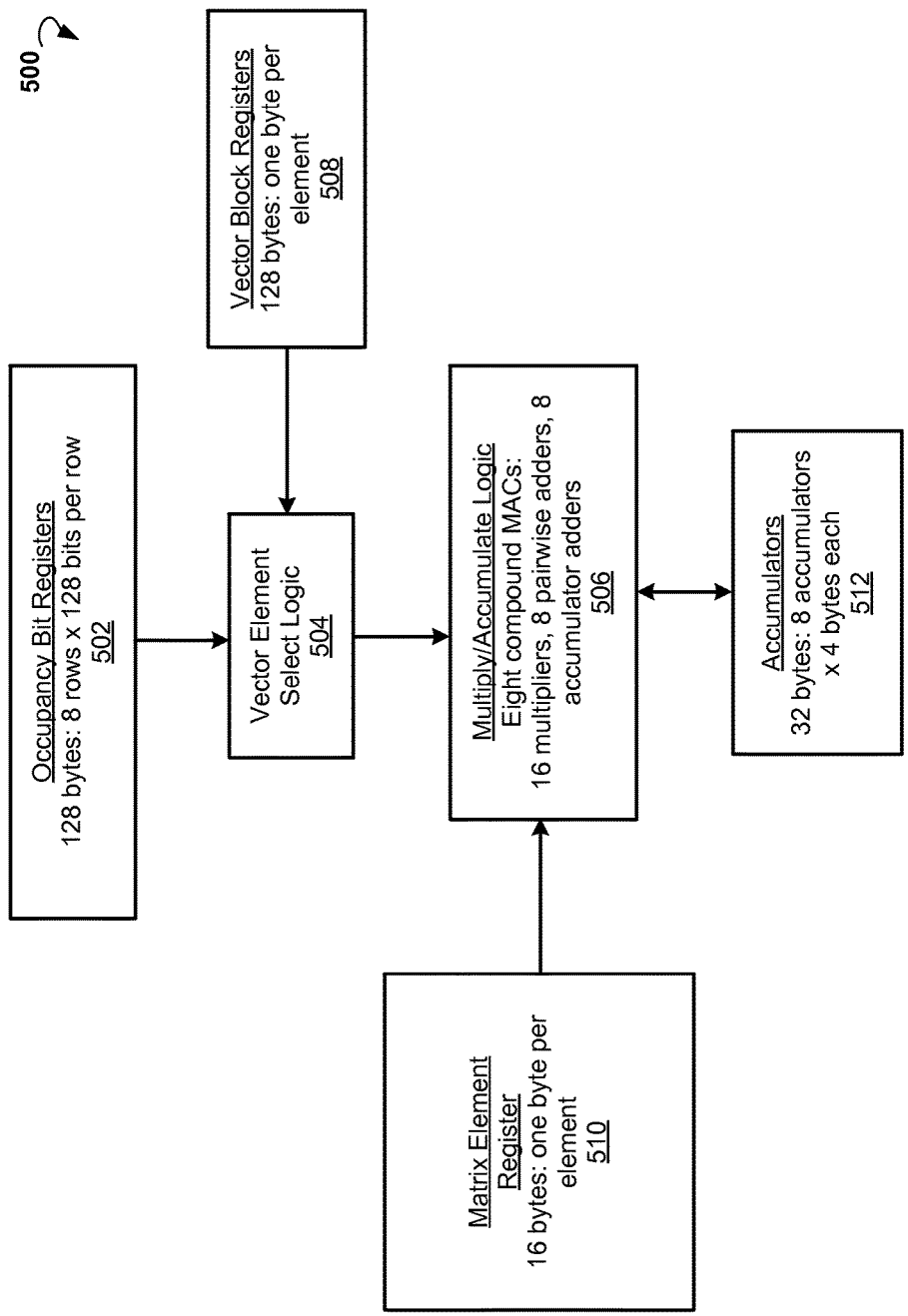
FIG. 5 is an example block diagram of a SIMD system performing a sparse matrix vector multiplication.

FIG. 5 is a block diagram for an example SIMD system 500 for a sparse matrix vector multiplication. The SIMD system 500 includes occupancy bit registers 502, vector element select logic 504, multiply/accumulate logic 506, vector block registers 508, matrix element register 510, and accumulators 512. In SIMD system 500, C=16, R=8, B=128, and elements are of 1-byte size. The SIMD system 500 highlights some of the hardware requirements outlined in the description of FIG. 4.

Figure 6:
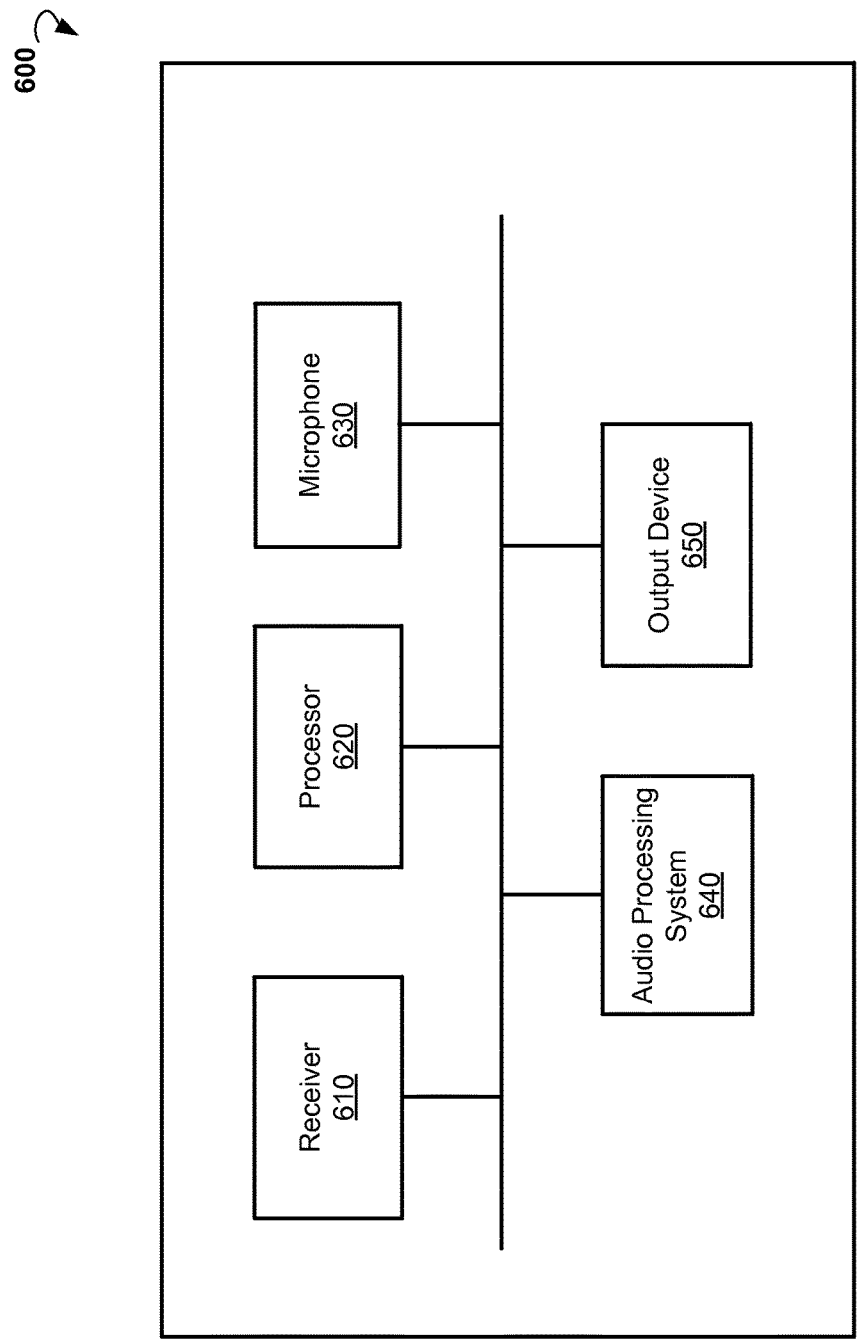
FIG. 6 is a block diagram of an example mobile device, in which embodiments of the present disclosure can be implemented.

FIG. 6 is a block diagram showing a system 600 suitable for implementing methods, according to various example embodiments of the present disclosure. The example system 600 may include a receiver 610, a processor 620, a microphone 630, an audio processing system 640, and an output device 650. The system 600 may comprise more or other components to provide a particular operation or functionality. Similarly, the system 600 may comprise fewer components that perform similar or equivalent functions to those depicted in FIG. 6.

The receiver 610 can be configured to communicate with a network such as the Internet, Wide Area Network (WAN), Local Area Network (LAN), cellular network, and so forth, to receive an audio data stream. The received audio data stream may then be forwarded to the audio processing system 640 and the output device 650.

The processor 620 may include hardware and software that implement the processing of audio data and various other operations depending on a type of the system 600 (e.g., communication device and computer). A memory (e.g., non-transitory computer readable storage medium) may store, at least in part, instructions and data for execution by processor 620.

The audio processing system 640 may include hardware and software, according to various embodiments disclosed herein. The audio processing system 640 is further configured to receive acoustic signals from an acoustic source via microphone 630 (which may be one or more microphones or acoustic sensors) and process the acoustic signals. After reception by the microphone 630, the acoustic signals may be converted into electric signals by an analog-to-digital converter.

The output device 650 is any device which provides an audio output to a listener (e.g., the acoustic source). For example, the output device 650 may comprise a speaker, a class-D output, an earpiece of a headset, or a handset on the system 600.

Figure 7:
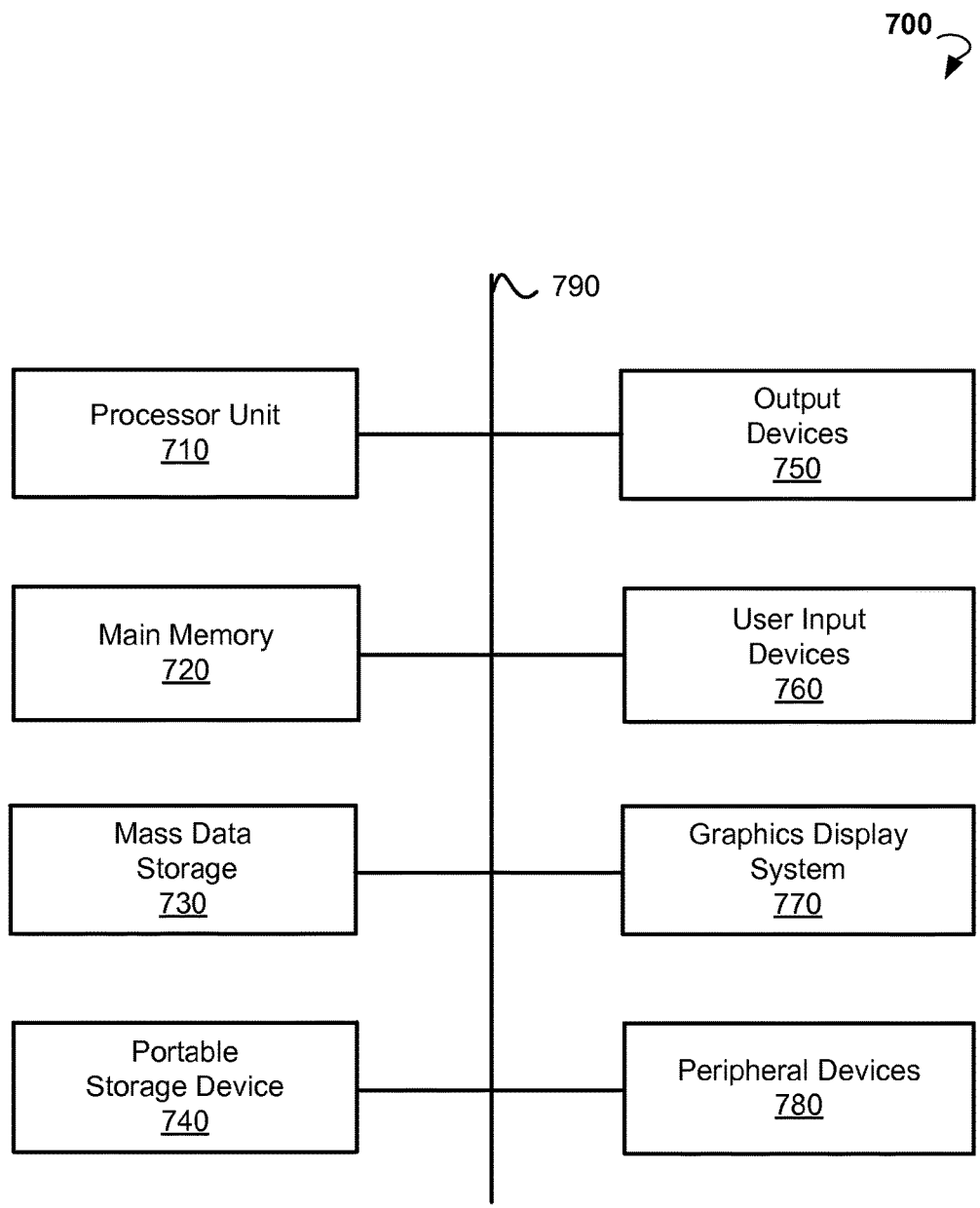
FIG. 7 is block diagram of an example computer system that may be used to implement embodiments of the present disclosure.

FIG. 7 illustrates an exemplary computer system 700 that may be used to implement some embodiments of the present disclosure. The computer system 700 of FIG. 7 may be implemented in the contexts of the likes of computing systems, networks, servers, or combinations thereof. The computer system 700 of FIG. 7 includes one or more processor unit(s) 710 and main memory 720. Main memory 720 stores, in part, instructions and data for execution by processor unit(s) 710. Main memory 720 stores the executable code when in operation, in this example. The computer system 700 of FIG. 7 further includes a mass data storage 730, portable storage device 740, output devices 750, user input devices 760, a graphics display system 770, and peripheral devices 780.

The components shown in FIG. 7 are depicted as being connected via a single bus 790. The components may be connected through one or more data transport means. Processor unit(s) 710 and main memory 720 are connected via a local microprocessor bus, and the mass data storage 730, peripheral device(s) 780, portable storage device 740, and graphics display system 770 are connected via one or more input/output (I/O) buses.

Mass data storage 730, which can be implemented with a magnetic disk drive, solid state drive, or an optical disk drive, is a non-volatile storage device for storing data and instructions for use by processor unit(s) 710. Mass data storage 730 stores the system software for implementing embodiments of the present disclosure for purposes of loading that software into main memory 720.

Portable storage device 740 operates in conjunction with a portable non-volatile storage medium, such as a flash drive, floppy disk, compact disk, digital video disc, or Universal Serial Bus (USB) storage device, to input and output data and code to and from the computer system 700 of FIG. 7. The system software for implementing embodiments of the present disclosure is stored on such a portable medium and input to the computer system 700 via the portable storage device 740.

User input devices 760 can provide a portion of a user interface. User input devices 760 may include one or more microphones, an alphanumeric keypad, such as a keyboard, for inputting alphanumeric and other information, or a pointing device, such as a mouse, a trackball, stylus, or cursor direction keys. User input devices 760 can also include a touchscreen. Additionally, the computer system 700 as shown in FIG. 7 includes output devices 750. Suitable output devices 750 include speakers, printers, network interfaces, and monitors.

Graphics display system 770 include a liquid crystal display (LCD) or other suitable display device. Graphics display system 770 is configurable to receive textual and graphical information and processes the information for output to the graphics display device 770.

Peripheral devices 780 may include any type of computer support device to add additional functionality to the computer system 700.

The components provided in the computer system 700 of FIG. 7 are those typically found in computer systems that may be suitable for use with embodiments of the present disclosure and are intended to represent a broad category of such computer components that are well known in the art. Thus, the computer system 700 of FIG. 7 can be a personal computer (PC), hand held computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX ANDROID, IOS, CHROME, TIZEN and other suitable operating systems.

The processing for various embodiments may be implemented in software that is cloud-based. In some embodiments, the computer system 700 is implemented as a cloud-based computing environment, such as a virtual machine operating within a computing cloud. In other embodiments, the computer system 700 may itself include a cloud-based computing environment, where the functionalities of the computer system 700 are executed in a distributed fashion. Thus, the computer system 700, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers that comprise a plurality of computing devices, such as the computer system 700, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

The present technology is described above with reference to example embodiments. Therefore, other variations upon the example embodiments are intended to be covered by the present disclosure.

What is claimed is:

1. A system having a single instruction multiple data architecture, the system comprising:
   a plurality of computational units;
   a processor executing instructions for preparing a M×N sparse matrix; and
   memory storing groups of single dimensional sub-arrays representative of the M×N sparse matrix that has been prepared by the processor,
   the single dimensional sub-arrays including all non-zero elements in a first common dimension of the M×N sparse matrix, each group being sorted with respect to the other groups based on a number of non-zero value elements in the single dimensional sub-arrays in the each group, a number of single dimensional sub-arrays in each group not more than a number (R) of single dimensional sub-arrays processed in parallel by the plurality of computational units,
   the single dimensional sub-arrays of each group have a common number of matrix elements, at least one group having single dimensional sub-arrays that have been packed to remove zero-value elements so as to arrive at the common number,
   wherein a number (C) of the computational units are configured to multiply, in parallel, C elements of the single dimensional sub-arrays in each group with one or more elements of a vector.

2. The system of claim 1, each computational unit includes a vector element selection unit, wherein the vector selection units are configured to select elements of the vector before multiplication.

3. The system of claim 1, each computational unit includes a multiply accumulate unit, wherein the multiply accumulate units are configured to multiply, in parallel, the C elements of the single dimensional sub-arrays with elements of a vector.

4. The system of claim 1, wherein the first common dimension is a horizontal dimension of the M×N sparse matrix.

5. The system of claim 1, wherein R is not greater than C.

6. The system of claim, 1 wherein the C computational units of the processor are divided among the R single dimensional sub-arrays.

7. The system of claim 1 further comprising a plurality of registers, wherein the computational units are configured to select elements of the vector based on data in registers before multiplying elements of the vector and elements of the single dimensional sub-arrays.

8. The system of claim 1, wherein, after multiplication, the processor is configured to access and use reordering indices of the single dimensional sub-arrays based on data stored in memory.

9. A system having a single instruction multiple data (SIMD) architecture, the system comprising:
a plurality of computational units;
a processor executing instructions for preparing a M×N sparse matrix; and
memory storing processor-executable instructions and elements of the M×N sparse matrix represented by groups of single dimensional sub-arrays,
the single dimensional sub-arrays including all non-zero elements in a first common dimension of the M×N sparse matrix, each group being sorted with respect to the other groups based on a number of non-zero value elements in the single dimensional sub-arrays in the each group, a number of single dimensional sub-arrays in each group is not more than a number (R) of single dimensional sub-arrays processed in parallel by the plurality of computational units,
the single dimensional sub-arrays in each group having a common number of matrix elements, at least one group having single dimensional sub-arrays that have been packed to remove zero-value elements so as to arrive at the common number,
wherein upon execution of the processor-executable instructions, a number (C) of the computational units are configured to multiply, in parallel, C elements of the single dimensional sub-arrays in each group with one or more elements of a vector.

10. The system of claim 9, each computational unit includes a vector element selection unit, wherein the processor-executable instructions configure the vector selection units of the C computational units to select elements of the vector before multiplication.

11. The system of claim 9, each computational unit includes a multiply accumulate unit, wherein the processor-executable instructions configure the multiply accumulate units of the C computational units to multiply the C elements of the single dimensional sub-arrays with elements of a vector.

12. The system of claim 9 further comprising a plurality of registers, wherein the processor-executable instructions configure the computational units to select elements of the vector based on data in registers before multiplying elements of the vector and elements of the single dimensional sub-arrays.

13. The system of claim 9, wherein, after multiplication, the processor-executable instructions configure the processor to compensate for any reordering of the single dimensional sub-arrays based on data stored in memory.

14. The system of claim 9, wherein the elements of each single dimensional sub-array are in a horizontal row of the M×N sparse matrix.

15. A method in a processor having a single instruction multiple data architecture including a plurality of computational units and memory, the method comprising:
providing a number (C) of elements of single dimensional sub-arrays of a group to C computational units of the processor, the C elements of the single dimensional sub-arrays stored in the memory,
the single dimensional sub-arrays including all non-zero value elements in a first common dimension of an M×N sparse matrix, each group being sorted with respect to the other groups based on a number of non-zero value elements in the single dimensional sub-arrays in the each group, a number of single dimensional sub-arrays in each group not more than a number (R) of single dimensional sub-arrays processed in parallel by the plurality of computational units,
the single dimensional sub-arrays in each group having a common number of matrix elements, at least one group having single dimensional sub-arrays that have been packed to remove zero-value elements so as to arrive at the common number; and
multiplying, in parallel, the C elements of the single dimensional sub-arrays and one or more elements of a vector using the C computational units.

16. The method of claim 15 further comprising selecting elements of the vector based on data accessible by the computational units before multiplying elements of the vector and elements of the single dimensional sub-arrays.

17. The method of claim 16, after multiplying, compensating for any reordering of the single dimensional sub-arrays based on data stored in memory.

18. The method of claim 15, wherein the first common dimension is a horizontal row of the M×N sparse matrix.

19. A method in a processor for compressing an M×N sparse matrix for processing by a single instruction multiple data (SIMD) architecture processor having a plurality of computational units, the method comprising:
grouping single dimensional sub-arrays of an M×N sparse matrix based on a number of non-zero value elements in each single dimensional sub-array, each of the single dimensional sub-arrays arranged in a first common dimension, wherein a number of single dimensional sub-arrays in each group is not more than a number (R) of single dimensional sub-arrays to be processed in parallel by the plurality of computational units of the SIMD architecture processor;
reducing a number of elements in the single dimensional sub-arrays of at least one group by dropping zero-value elements, without dropping non-zero value elements, wherein the single dimensional sub-arrays in each group have a common number of matrix elements.

20. The method of claim 19, further comprising
dividing the sparse matrix into blocks of single dimensional sub-arrays arranged in a second common dimension of the sparse matrix prior to grouping, the first common dimension corresponding to one of the dimensions of the M×N sparse matrix and the second common dimension corresponding to the other of the dimensions of the M×N sparse matrix, performing the grouping and reducing on each of the blocks separately.

21. The method of claim 19, wherein reducing the number of elements in the single dimensional sub-arrays of at least one group is performed so that each single dimensional sub-array in a given group has a common number of elements wherein each of the single dimensional sub-arrays in the group with a reduced number of elements includes at least one zero-value element.

* * * * *